(12) United States Patent
Onojima et al.

(10) Patent No.: US 8,315,141 B2
(45) Date of Patent: Nov. 20, 2012

(54) OBJECTIVE LENS DRIVING APPARATUS

(75) Inventors: Noboru Onojima, Saitama (JP); Shingo Matsuzaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/407,147

(22) Filed: Mar. 19, 2009

(65) Prior Publication Data

US 2009/0238062 A1 Sep. 24, 2009

(30) Foreign Application Priority Data

Mar. 24, 2008 (JP) ................ 2008-076457

(51) Int. Cl.
*G11B 7/135* (2006.01)

(52) U.S. Cl. ................ 369/112.23

(58) Field of Classification Search ............ None
See application file for complete search history.

(56) References Cited

U.S. PATENT DOCUMENTS

| 5,126,983 | A * | 6/1992 | Ikegame et al. ........... 369/13.15 |
| 7,058,960 | B2 * | 6/2006 | Kim et al. ................ 720/683 |
| 2007/0147197 | A1 * | 6/2007 | Huang et al. ............... 369/44.15 |

FOREIGN PATENT DOCUMENTS

| CN | 1731516 | 2/2006 |
| CN | 1835098 | 9/2006 |
| JP | 2005-38496 | 2/2005 |
| JP | 2006-260704 | 9/2006 |

OTHER PUBLICATIONS

Chinese Office Action for Application No. 2009101197232, dated Dec. 31, 2011 (5 pages.).
Office Action for Application No. 2008-076457, mailed May 22, 2012, 2 pages.
Chinese Office Action for Application No. 200910119723.2 mailed Jun. 14, 2012, 6 pages.

* cited by examiner

*Primary Examiner* — Joseph Feild
*Assistant Examiner* — Parul Gupta
(74) *Attorney, Agent, or Firm* — Fish & Richardson P.C.

(57) ABSTRACT

An objective-lens-driving apparatus comprising: a base opposed to a signal surface of an optical disc; an objective-lens holder including an objective lens, first and second focusing coils arranged across the objective lens in a tracking direction of the disc, first and second tracking coils arranged across the first-focusing coil in a tangential direction of the disc, and third and fourth tracking coils arranged across the second-focusing coil in the tangential direction, the objective-lens holder being supported on the base movably in a focusing direction of the disc and the tracking direction; and first to fourth magnets arranged on the base to be respectively opposed in the tangential direction to the first to fourth tracking coils, the first and second magnets each having two poles polarized in the tracking direction, magnetization widths of the two poles with respect to the first-focusing coil in the tracking direction being different from each other.

3 Claims, 10 Drawing Sheets

OBJECTIVE LENS DRIVING APPARATUS

CROSS-REFERENCE TO RELATED APPLICATION

This application claims the benefit of priority to Japanese Patent Application No. 2008-076457, filed Mar. 24, 2008, of which full contents are incorporated herein by reference.

BACKGROUND OF THE INVENTION

1. Field of the Invention

The present invention relates to an objective lens driving apparatus.

2. Description of the Related Art

An objective lens driving apparatus is known which drives an objective lens for focusing a laser beam for recording information on a signal recording surface of an optical disc or reproducing information therefrom. At the time of the recording or reproduction, the laser beam needs to follow a track and to be focused thereon. Therefore, the objective lens driving apparatus is capable of moving the objective lens in a focusing direction perpendicular to a disc surface of the optical disc and a tracking direction perpendicular to the track on the disc surface (radial direction of the optical disc), so that focus deviation and tracking deviation of the laser beam are corrected (focusing control and tracking control). The objective lens driving apparatus is a part of an optical pickup apparatus that records information into an optical disc or reproduces information therefrom, for example.

An objective lens driving apparatus having two axes is known which is capable of driving an objective lens in the focusing direction and the tracking direction (see, e.g., Japanese Patent Application Laid-Open Publication No. 2006-260704).

Figure 6A:
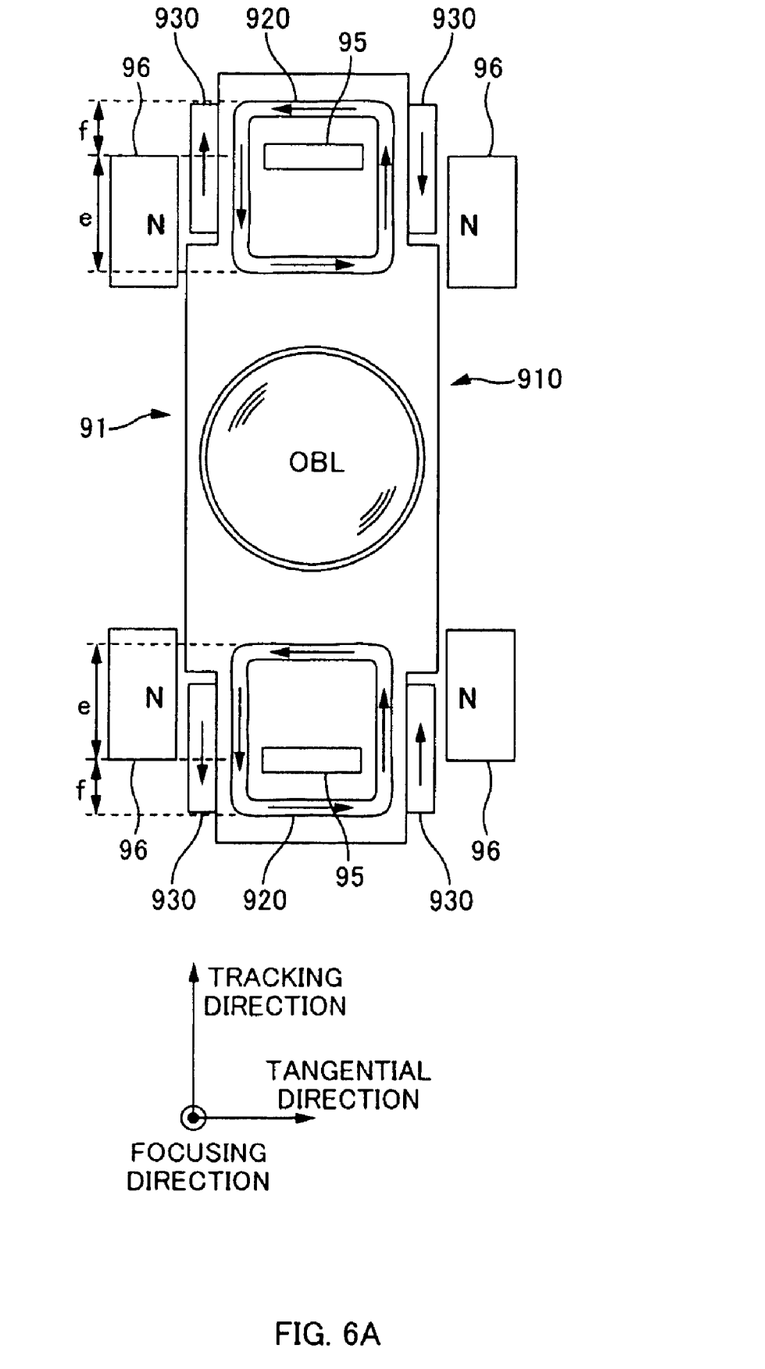
FIG. 6A is a plan view of an objective lens holder and magnets included in an objective lens driving apparatus.

An exemplary configuration of an objective lens driving apparatus 91 will hereinafter be described with reference to FIGS. 6A and 6B. FIG. 6A is a plan view of an objective lens holder 910 and magnets 96 included in the objective lens driving apparatus 91, and FIG. 6B is a side view of the objective lens holder 910 and the magnets 96.

Figure 6B:
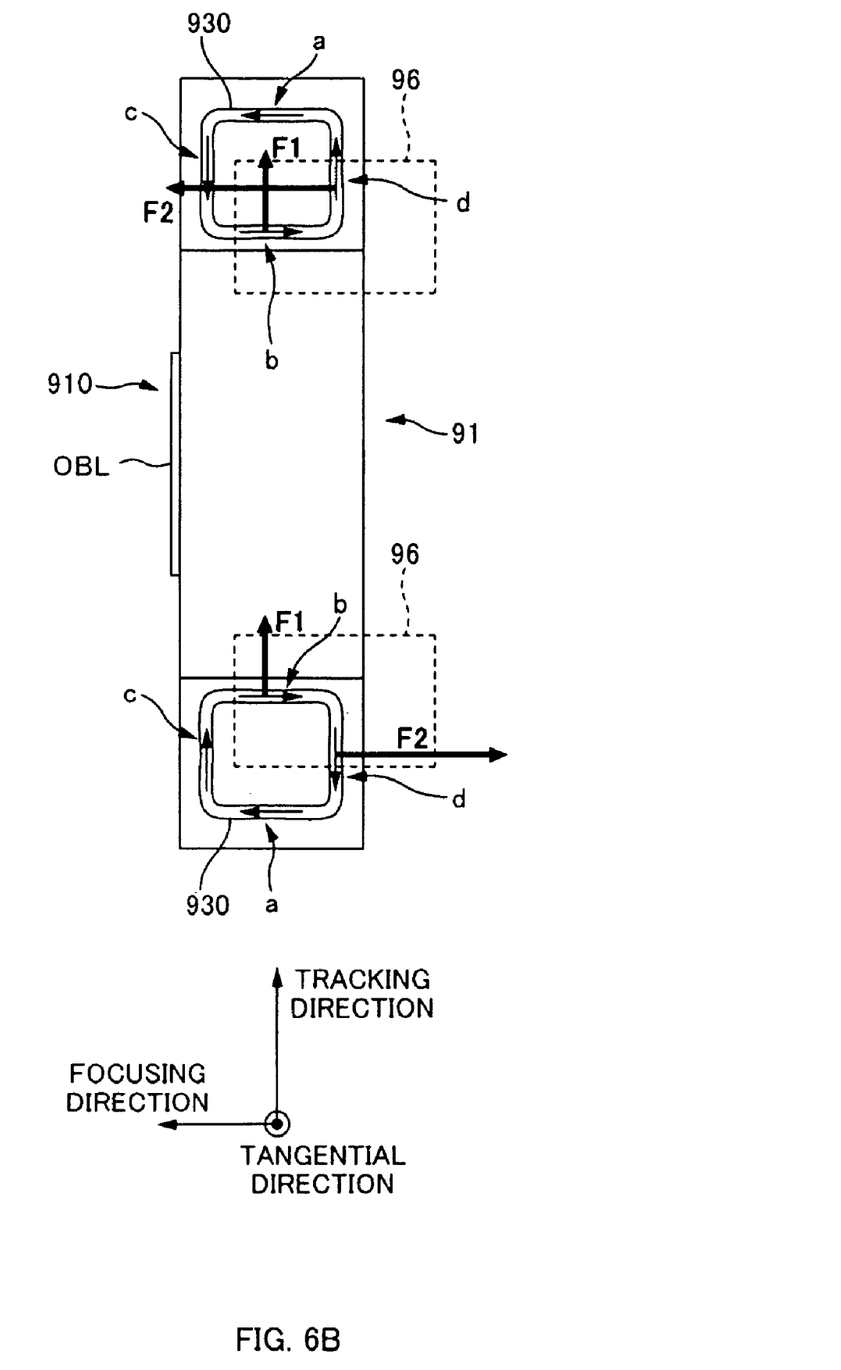
FIG. 6B is a side view of an objective lens holder and magnets included in an objective lens driving apparatus.

The objective lens driving apparatus 91 exemplarily illustrated in FIGS. 6A and 6B includes the objective lens holder 910 in a substantially rectangular parallelepiped shape elongated in the tracking direction. The objective lens holder 910, for example, holds an objective lens OBL centrally in the tracking direction on a main body in the substantially rectangular parallelepiped shape, includes a total of two focusing coils 920 respectively provided at both ends in the tracking direction of the main body, and includes a total of four tracking coils 930 respectively provided on both sides of the both ends of the main body. Each focusing coil 920 has a winding axis in the focusing direction, and each tracking coil 930 has a winding axis in a tangential direction (tangential direction of the track). Although the objective lens holder 910 is supported by a predetermined supporting means on a predetermined base, the base, the supporting means, etc., are not depicted for convenience of illustration.

As shown in FIGS. 6A and 6B, for example, two yokes 95 are projected from the base (not shown) so as to be respectively surrounded by the two focusing coils 920. Each of the four monopole magnets 96 is fixed to the base so as to be opposed to a portion of each of the four respective tracking coils 930 in the tracking direction. In FIGS. 6A and 6B, all surfaces of the magnets 96 opposed to the objective lens holder 910 are magnetized into N-poles, for example.

In the case of the focusing control, if currents are supplied to the focusing coils 920 in a counterclockwise direction as shown by arrows in FIG. 6A, a force in the focusing direction on a positive side (on a side of an optical disc not shown mounted on a turn table not shown) acts on the focusing coils 920 in a magnetic field between the magnets 96 and the yokes 95, so that the objective lens holder 910 is moved in the same direction on the same side.

In the case of the tracking control, if currents are supplied to the tracking coils 930 in the direction shown by arrows in FIGS. 6A and 6B, for example, a force in the tracking direction on a positive side acts on the tracking coils 930 in the magnetic field between the magnets 96 and the yokes 95, so that the objective lens holder 910 is moved in the same direction on the same side.

As shown in FIG. 6B, the tracking coils 930 and the magnets 96 are so arranged as not to be opposed completely with respect to the tracking direction so that an effective force for the tracking control acts on the tracking coils 930. In the magnetic field between the magnets 96 and the yokes 95, a force F1 in the tracking direction acts on the current flowing through one side b of a pair of sides a and b making up the tracking coil 930 in a substantially rectangle shape, for example. However, if the other side a is also in the same magnetic field, a force in a direction opposite to F1 in the tracking direction acts on the current flowing through the side a, and therefore, the two forces consequently cancel each other out. To avoid this situation, an arrangement configuration is made such that the side a is not opposed to the magnet 96 so that mainly F1 acts on the tracking coil 930 in the tracking direction. Since almost no force acts on the current flowing through the side a of the tracking coil 930 as above, it cannot be said that the current flowing through the tracking coil 930 is sufficiently effectively utilized for the tracking control, and therefore, it become difficult to improve sensitivity of the tracking control. This may result in insufficient improvement in the recording/reproducing characteristics of the optical pickup apparatus.

Description will be made of the case of further performing the tracking control in a state where a portion of the tracking coil 930 lies off the magnet 96 by supplying a current to the focusing coil 920 to move the objective lens holder 910 in the positive focusing direction, as shown in FIG. 6B. Firstly, with regard to a pair of sides c and d making up the tracking coil 930 on the positive side in the tracking direction, although a force F2 in the positive focusing direction acts on the current flowing through one side d opposed to the magnet 96, the other side c is not opposed to the magnet 96, and therefore, almost no force acts on the current flowing through the side c. On the other hand, with regard to a pair of sides c and d making up the tracking coil 930 on the negative side in the tracking direction, although the force F2 in the focusing direction on the negative side (on a side away from the optical disc) acts on the current flowing through one side d opposed to the magnet 96, the other side c is not opposed to the magnet 96, and therefore, almost no force acts on the current flowing through the side c. As a result, the force F2 in a direction toward the optical disc acts on the two tracking coils 930 on the positive side in the tracking direction while the force F2 in a direction away from the optical disc acts on the two tracking coils on the negative side in the tracking direction, and thus, counterclockwise moment in FIG. 6B acts on the objective lens holder 910. If the objective lens holder 910 rolls by the action of such moment, coma aberration is generated in the objective lens OBL and the recording/reproducing characteristics of the optical pickup apparatus may be deteriorated. The above phenomenon in which a portion of the tracking coil 930 lies off the magnet 96 tends to be more marked, as the optical pickup apparatus becomes thinner in the focusing direction. This leads to a conflict between the thinning down and the maintenance or improvement in recording/reproducing characteristics, in specifications of the optical pickup apparatus.

As shown in FIG. 6A, a pair of the magnets 96 in the tangential direction is arranged so as not to completely sandwich the focusing coils 920 with respect to the tracking direction, due to the relationship with the tracking coils 930. In the magnetic field between the magnets 96 and the yokes 95, a force in the focusing direction acts on the current flowing through portions e sandwiched by the magnets 96 in a pair of sides making up the focusing coil 920 in a substantially rectangular shape, however, almost no force acts on the current flowing through portions f not sandwiched by the magnets 96. On the other hand, it is known that antinodes of a standing wave in high-order bending vibration mode specific to the objective lens holder 910 is generally positioned at the both ends in the tracking direction of the objective lens holder 910. Therefore, if forces in the focusing direction on a predetermined side do not act on portions of the above f closer to the both ends, it becomes difficult to restrain high-order resonance excited at the time of the focusing control. In this case, the recording/reproducing characteristics of the optical pickup apparatus may be deteriorated due to the high-order resonance of the objective lens OBL.

SUMMARY OF THE INVENTION

An objective lens driving apparatus according to an aspect of the present invention, comprises: a base opposed to a signal surface of an optical disc; an objective lens holder including an objective lens, first and second focusing coils arranged across the objective lens in a tracking direction of the optical disc, first and second tracking coils arranged across the first focusing coil in a tangential direction of the optical disc, and third and fourth tracking coils arranged across the second focusing coil in the tangential direction, the objective lens holder being supported on the base movably in a focusing direction of the optical disc and in the tracking direction; and first to fourth magnets arranged on the base so as to be respectively opposed in the tangential direction to the first to fourth tracking coils, the first and second magnets each having two poles polarized in the tracking direction, magnetization widths of the two poles with respect to the first focusing coil in the tracking direction being different from each other.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

=Configuration of Objective Lens Driving Apparatus=

Figure 1:
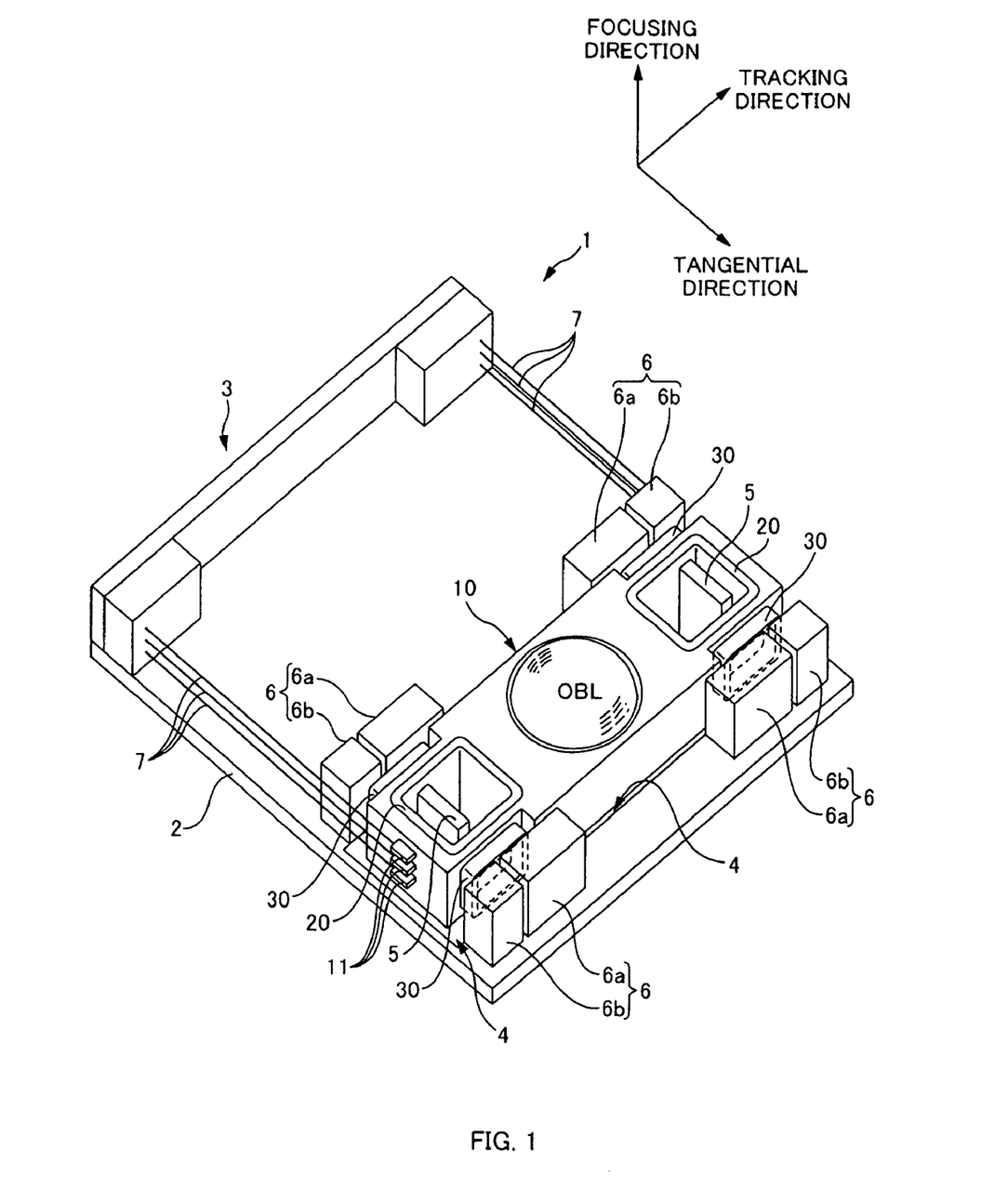
FIG. 1 is a perspective view of an objective lens driving apparatus according to an embodiment of the present invention.

An example will be described of a configuration of an objective lens driving apparatus 1 according to an embodiment with reference to FIG. 1. FIG. 1 is a perspective view of the objective lens driving apparatus 1 according to an embodiment of the present invention.

The objective lens driving apparatus 1 according to an embodiment of the present invention includes: a base 2; an objective lens holder 10 holding an objective lens OBL and having two focusing coils 20 and four tracking coils 30; two magnet-sets each having a pair of magnets 6a arranged in the tangential direction on the base 2 across a portion of the focusing coil 20, which portion is closer to the OBL in the tracking direction; and two magnet-sets each having a pair of magnets 6b arranged in the tangential direction on the base 2 across a portion of the focusing coils 20, which portion is farther from the OBL in the tracking direction.

In an embodiment of the present invention, the portion of the focusing coil 20, which is closer to the OBL in the tracking direction and sandwiched by the pair of the magnets 6a, is set longer than the portion of the focusing coil 20, which is farther from the OBL in the tracking direction and sandwiched by the pair of the magnets 6b. That is, the pair of the magnets 6a with respect to each focusing coil 20 in the tracking direction is set greater in magnetization width than the pair of the magnets 6b with respect to the focusing coil 20 in the tracking direction. In an embodiment of the present invention, the opposed surfaces of the pair of the magnets 6a are magnetized into the same pole, and the opposed surfaces of the pair of the magnets 6b are magnetized into the same pole different from the pole of the magnets 6a.

The base 2 is a base made of metal in a plate shape opposed to a signal recording surface of an optical disc (not shown) mounted on a turn table (not shown). The base 2 includes: a yoke (not shown) having the four magnets 6a and the four magnets 6b in total fixed thereto, two yokes 5 which will be described later; and a fixing plate 3 for fixing one ends of elastic wires 7, which will be described later, for supporting the objective lens holder 10. The base 2 is formed with an opening 4 in a portion opposed to the bottom of the objective lens holder 10 and formed in a shape capable of surrounding a bottom portion of the objective lens holder 10. In an embodiment of the present invention, the yoke not shown, the two yokes 5, and the fixing plate 3, descried above, are formed by bending portions of a plate made of metal making up the base 2.

The objective lens holder 10 includes a main body made of a resin in a substantially rectangular parallelepiped shape elongated in the tracking direction, holds the objective lens OBL in a center portion in the tracking direction of the main body, includes the two focusing coils 20 in total respectively disposed at the ends in the tracking direction of the main body, and includes the four tracking coils 30 respectively disposed on the sides of the both ends of the main body, for example. Each focusing coil 20 in a substantially rectangular shape has a winding axis in the focusing direction, and each tracking coil 30 in a substantially rectangular shape has a winding axis in the tangential direction.

As described above, the pair of the magnets 6a in the tangential direction are fixed onto the base 2 so as to be arranged across the portion of the focusing coil 20 closer to the OBL in the tracking direction, and to be respectively opposed to the portions closer to the OBL in the tracking direction of the tracking coils 30 arranged across the focusing coil 20.

As described above, the pair of the magnets 6b in the tangential direction are fixed onto the base 2, so as to be arranged across the portion of the focusing coil 20 farther from the OBL in the tracking direction, and to be respectively opposed to the portions farther from the OBL in the tracking direction of the tracking coils 30 arranged across the focusing coil 20.

In an embodiment according to the present invention, each magnet 6a and magnet 6b opposed to each of the four tracking coils are fixed onto the base 2 as a magnet 6 with a predetermined narrow gap in the tracking direction. A width of each magnet 6 in the tracking direction is set at such a width in the tracking direction that the tracking coil 30 does not lie off at the time of the tracking control, which will be described later.

The two yokes 5 extended in the focusing direction on the base 2 are respectively surrounded by the two focusing coils 20 in the objective lens driving apparatus 1 according to an embodiment of the present invention.

In the objective lens driving apparatus 1 according to an embodiment of the present invention, the other ends of the elastic wires 7 fixed to the fixing plate 3 on the base 2 at one ends thereof are fixed to support members 11 disposed on the both side surfaces in the tangential direction of the objective lens holder 10. Each of the side surfaces are provided with the three support members 11, and the other ends of the three elastic wires 7 are respectively fixed to the three support members 11, in an exemplarily illustration in FIG. 1. These six elastic wires 7 in total also have a function of respectively supplying currents to the two focusing coils 20 and the four tracking coils 30.

In the above configuration, in the magnetic fields between the magnets 6 and the yokes 5, predetermined currents are supplied to the focusing coils 20 and the tracking coils 30 through the elastic wires 7, so that the objective lens holder 10 supported by the fixing plate 3 through the elastic wires 7 can be moved in the focusing direction and the tracking direction.

In an embodiment according to the present invention, the focusing coil 20 on the positive side in the tracking direction corresponds to a first focusing coil, and the focusing coil 20 on the negative side in the tracking direction corresponds to a second focusing coil. The yoke 5 surrounded by the focusing coil 20 on the positive side in the tracking direction corresponds to a first yoke, and the yoke 5 surrounded by the focusing coil 20 on the negative side in the tracking direction corresponds to a second yoke.

In an embodiment according to the present invention, the tracking coil 30 on the positive side in the tracking direction and the negative side of the tangential direction corresponds to a first tracking coil, and the magnet 6 (the magnet 6a and the magnet 6b) on the same sides in the same directions corresponds to a first magnet.

In an embodiment according to the present invention, the tracking coil 30 on the positive side in the tracking direction and the positive side in the tangential direction corresponds to a second tracking coil, and the magnet 6 (the magnet 6a and the magnet 6b) on the same sides in the same directions corresponds to a second magnet.

In an embodiment according to the present invention, the tracking coil 30 on the negative side in the tracking direction and the negative side in the tangential direction corresponds to a third tracking coil, and the magnet 6 (the magnet 6a and the magnet 6b) on the same sides in the same directions corresponds to a third magnet.

In an embodiment according to the present invention, the tracking coil 30 on the negative side in the tracking direction and the positive side in the tangential direction corresponds to a fourth tracking coil, and the magnet 6 (the magnet 6a and the magnet 6b) on the same sides in the same directions corresponds to a fourth magnet.

=Operation of Objective Lens Driving Apparatus=

Figure 2A:
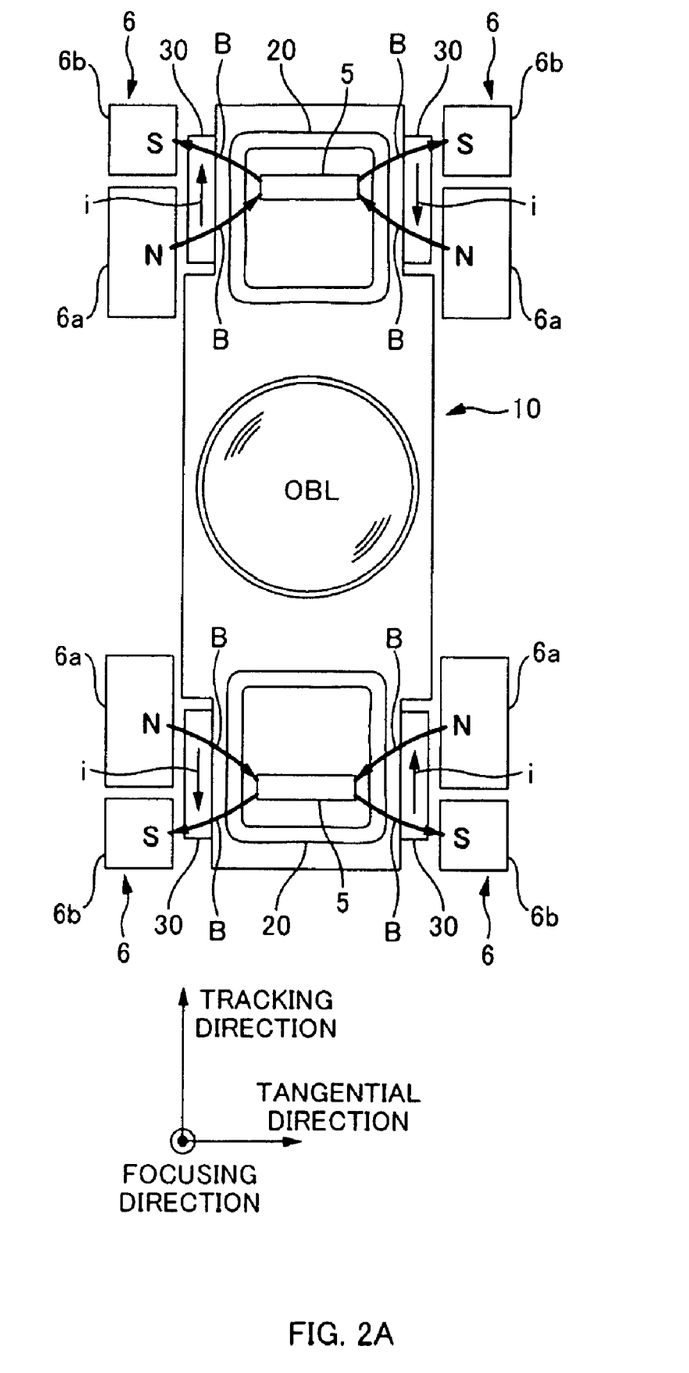
FIG. 2A is a plan view of an objective lens holder and magnets according to an embodiment of the present invention at the time of tracking control.
Figure 2B:
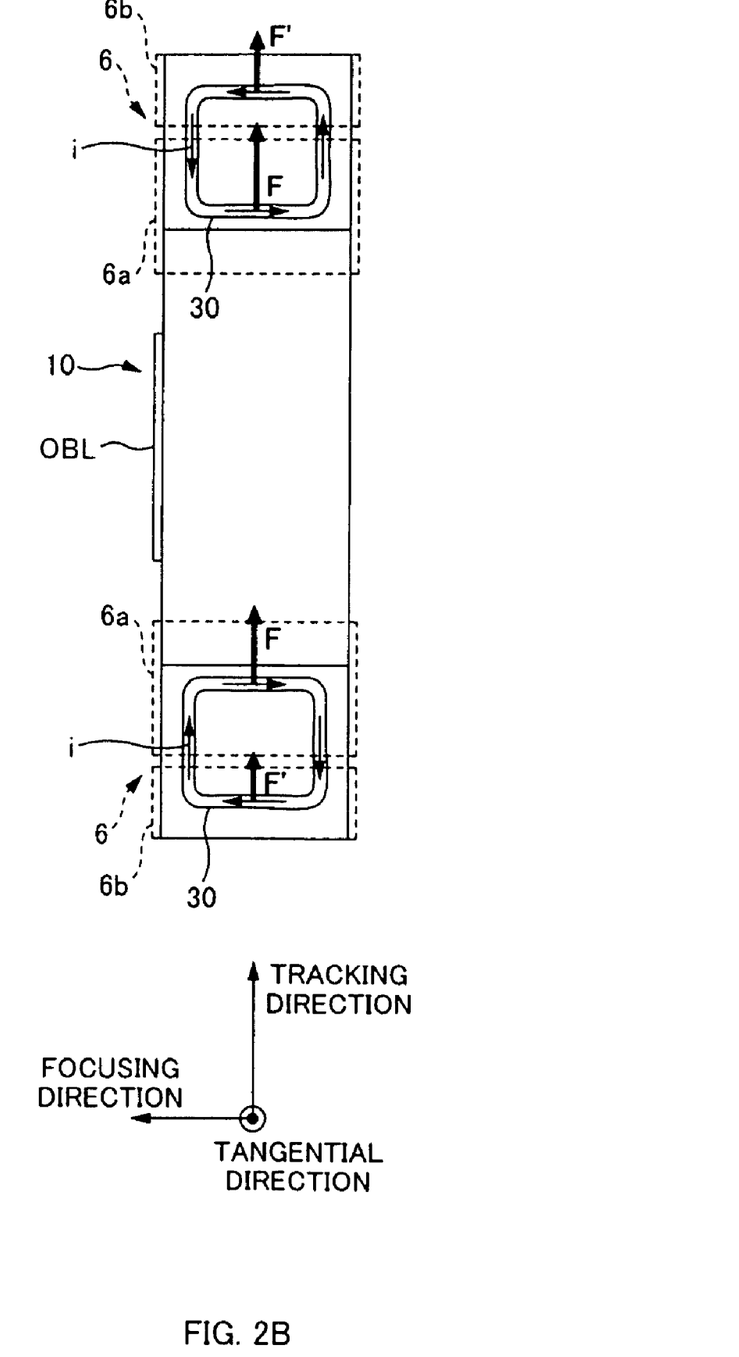
FIG. 2B is a side view of an objective lens holder and magnets according to an embodiment of the present invention at the time of tracking control.
Figure 3A:
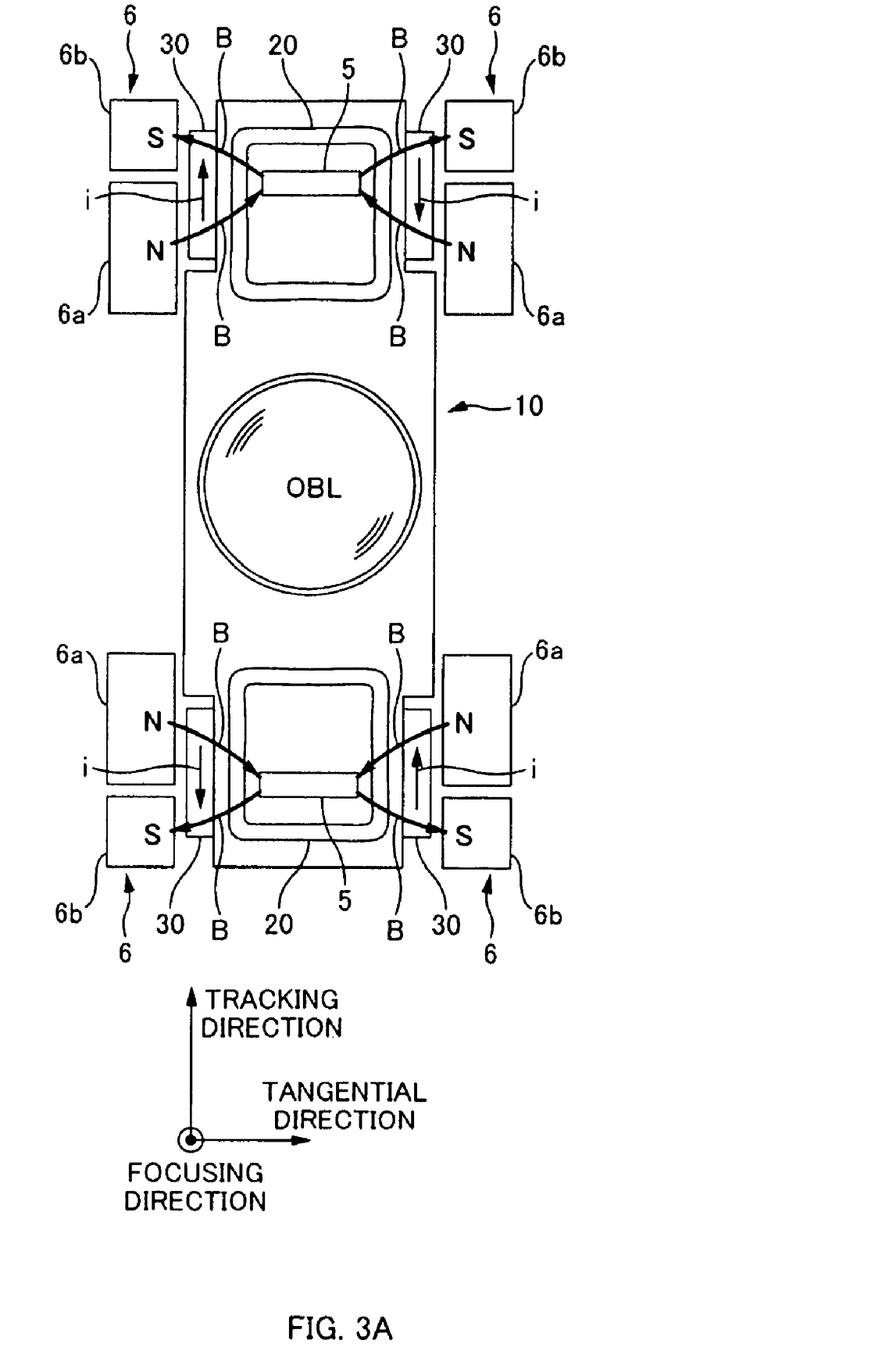
FIG. 3A is a plan view of an objective lens holder and magnets according to an embodiment of the present invention at the time of focusing control and tracking control.
Figure 3B:
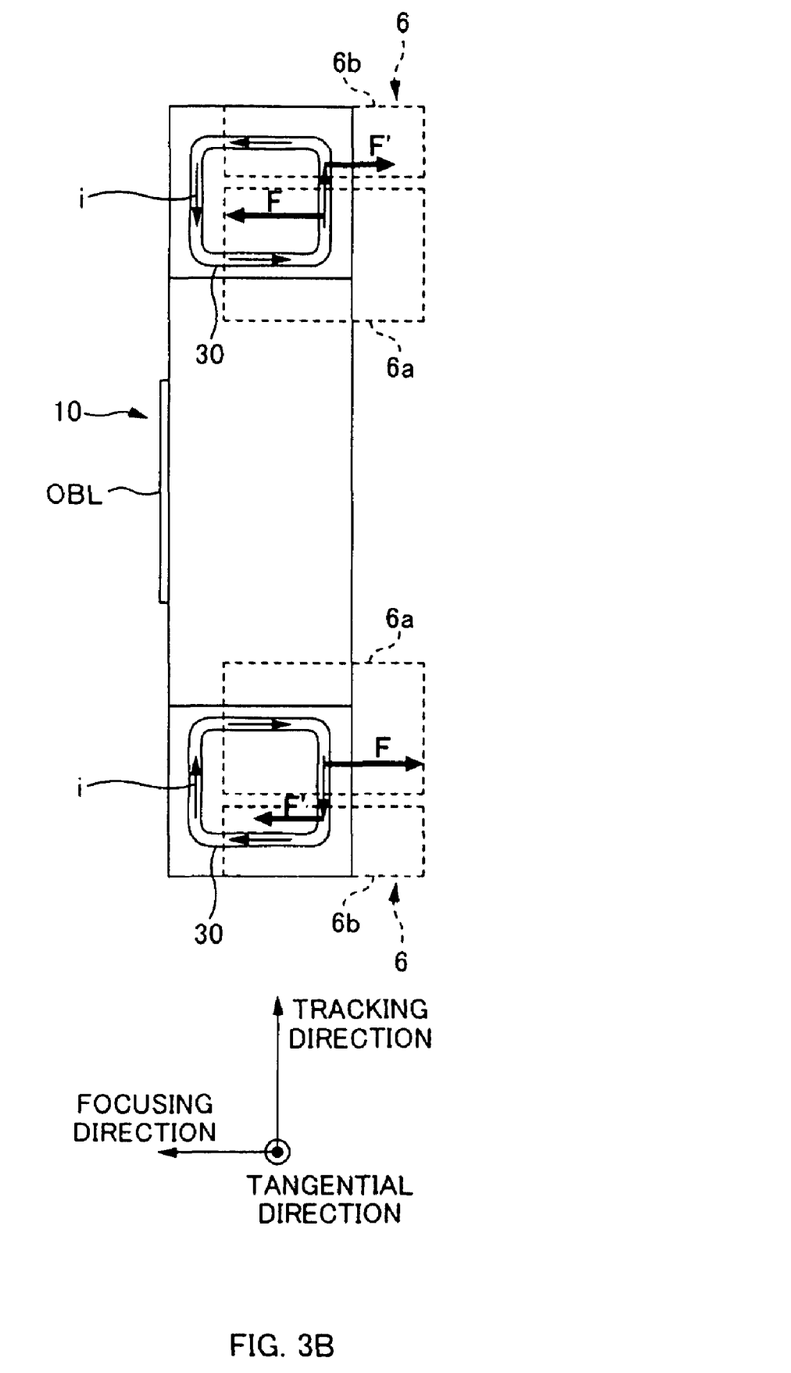
FIG. 3B is a side view of an objective lens holder and magnets of according to an embodiment of the present invention at the time of focusing control and tracking control.
Figure 4A:
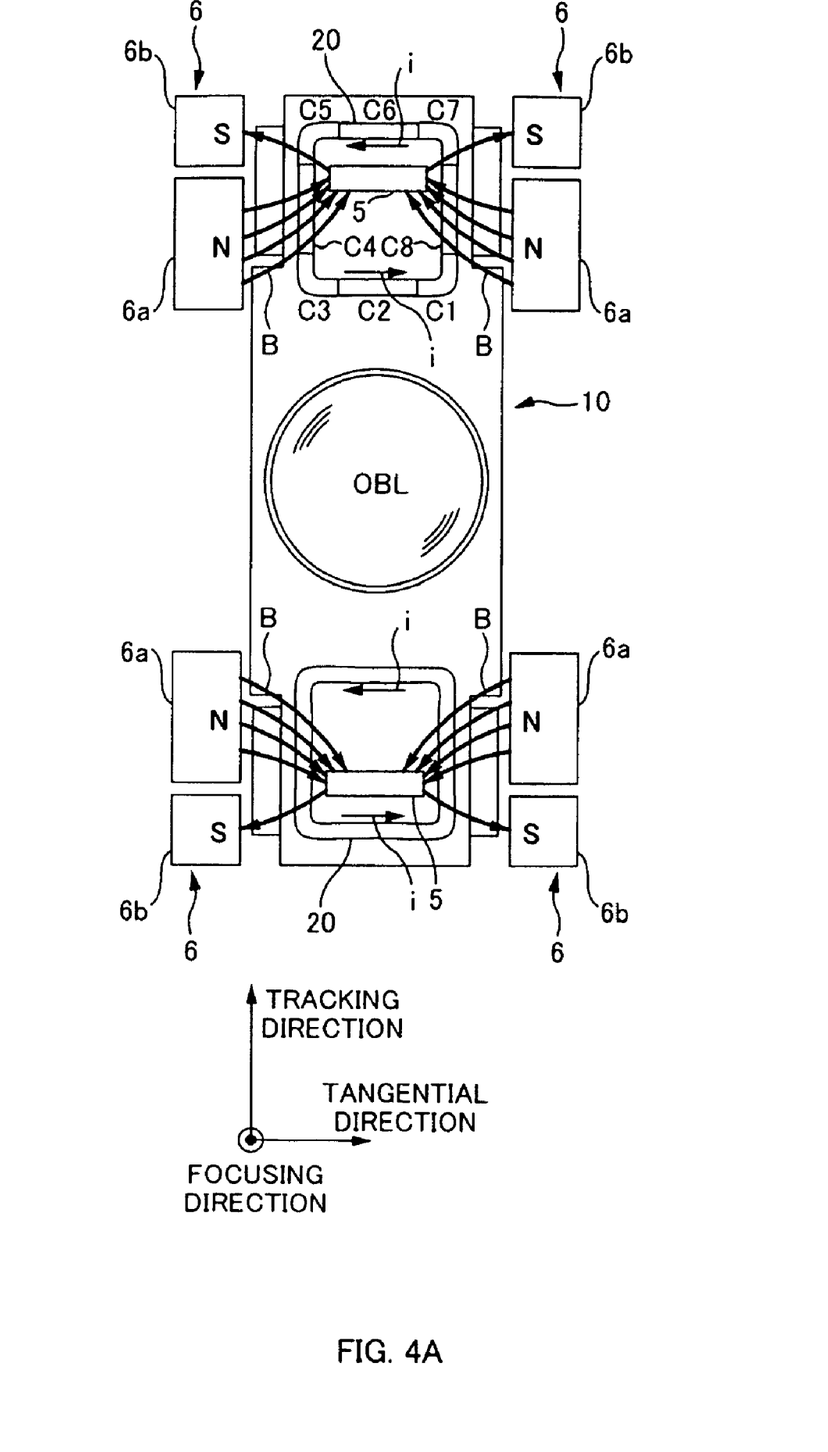
FIG. 4A is a plan view of an objective lens holder and magnets according to an embodiment of the present invention at the time of focusing control.
Figure 4B:
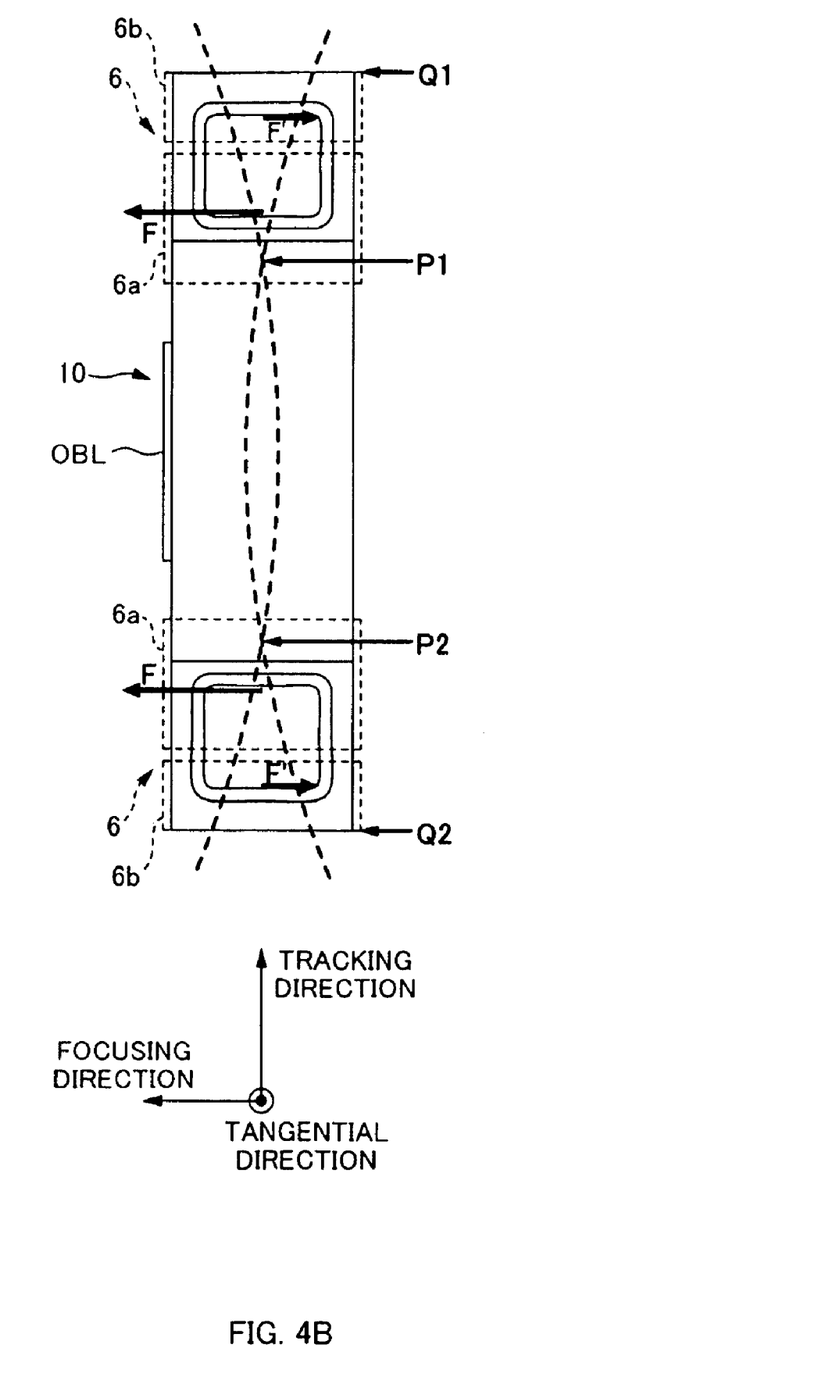
FIG. 4B is a side view of an objective lens holder and magnets of according to an embodiment of the present invention at the time of focusing control.
Figure 5:
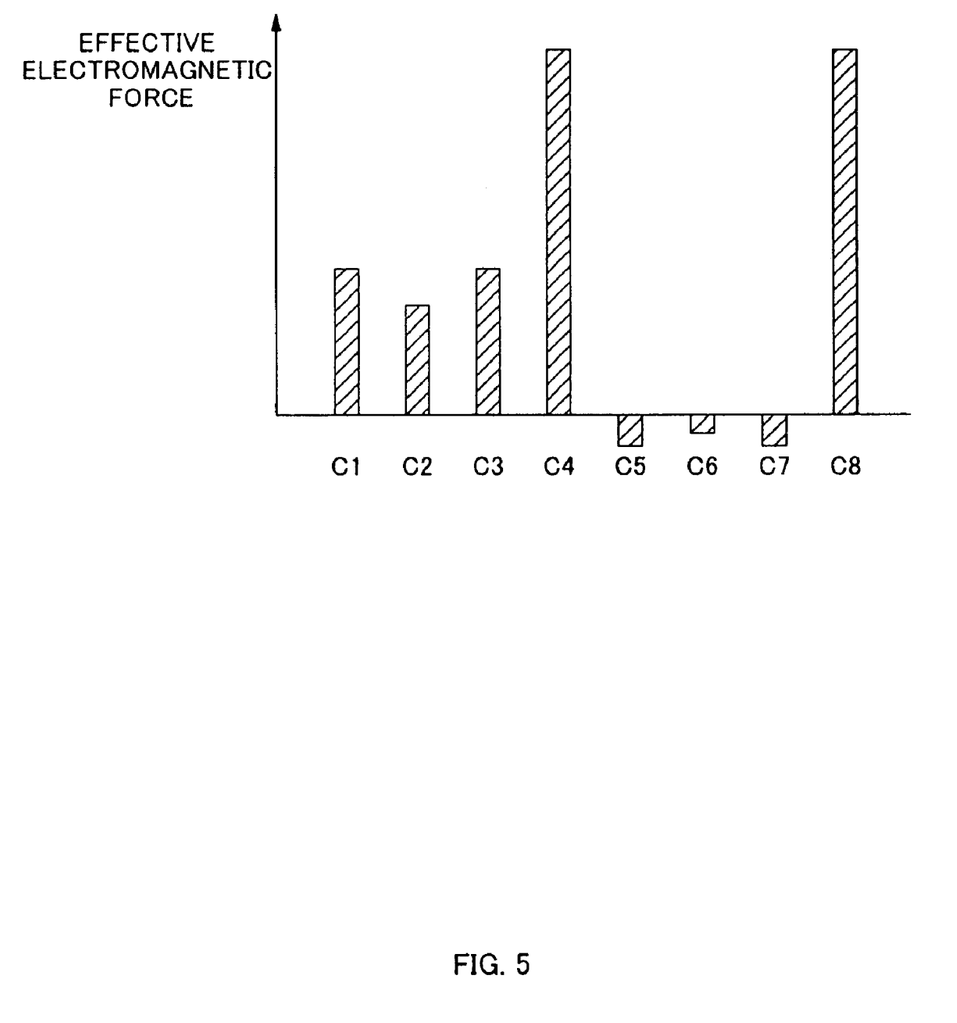
FIG. 5 is a histogram of an example of distribution of effective electromagnetic forces in a focusing coil according to an embodiment of the present invention.

An exemplary operation of the objective lens driving apparatus 1 according to an embodiment of the present invention will be described with reference to FIGS. 2A to 5. FIG. 2A is a plan view of the objective lens holder 10 and the magnets 6 according to an embodiment of the present invention at the time of the tracking control, and FIG. 2B is a side view of the objective lens holder 10 and the magnets 6 of FIG. 2A. FIG. 3A is a plan view of the objective lens holder 10 and the magnets 6 according to an embodiment of the present invention at the time of the tracking control and the focusing control, and FIG. 3B is a side view of the objective lens holder 10 and the magnets 6 of FIG. 3A. FIG. 4A is a plan view of the objective lens holder 10 and the magnets 6 according to an embodiment of the present invention at the time of the focusing control, and FIG. 4B is a side view of the objective lens holder 10 and the magnets 6 f FIG. 4A. FIG. 5 is a histogram of an example of distribution of effective electromagnetic forces in the focusing coil 20 according to an embodiment of the present invention.

It is assumed that all the surfaces of the magnets 6a opposed to the objective lens holder 10 are magnetized into N-pole, for example, and that all the surfaces of the magnets 6b opposed to the objective lens holder 10 are magnetized into S-pole, for example, in the exemplary illustrations of FIGS. 2A to 4B.

<<Tracking Control>>

As exemplarily illustrated in FIG. 2A, magnetic fields indicated by magnetic force lines B from the magnets 6a to the yokes 5 are formed between the magnets 6a and the yokes 5. On the other hand, magnetic fields indicated by magnetic force lines B from the yokes 5 to the magnets 6b are formed between the magnets 6b and the yokes 5. In such magnetic fields, when the objective lens holder 10 is moved in the positive tracking direction, for example, a current i is supplied to each tracking coil 30 in the direction indicated by the corresponding arrow.

As exemplarily illustrated in FIG. 2B, a force F and a force F' respectively act on sides in a pair in the focusing direction of each tracking coil 30. The force F is a Lorentz force acting on the current i in the magnetic field formed between the magnet 6a and the yoke 5, and the force F' is a Lorentz force acting on the current i in the magnetic field formed between the magnet 6b and the yoke 5. In an embodiment according to the present invention, this resultant force (F+F') is equally generated in each of the tracking coils 30.

Since one side and the other side of the pair of the sides in the focusing direction of the tracking coil 30 are respectively opposed to the magnet 6a and the magnet 6b having different polarities from each other, as above, the forces acting on the both sides can be made in the same direction. On the other hand, in an objective lens driving apparatus 91 shown in FIGS. 6A and 6B, almost no force acts on the current flowing through one side a of a pair of sides a and b in the focusing direction of the tracking coil 930. As compared to the above, in the objective lens driving apparatus 1 according to an embodiment of the present invention, the current flowing through the tracking coil 30 is more effectively utilized for the tracking control. Therefore, the sensitivity of the tracking control is improved, which leads to improvement in the recording/reproducing characteristics of the optical pickup apparatus.

<<Focusing Control and Tracking Control>>

The magnetic fields between the magnets 6 and the yokes 5 exemplarily illustrated in FIG. 3A are the same as the above described magnetic fields exemplarily illustrated in FIG. 2A. When predetermined currents are supplied to the two focusing coils 20 in such magnetic fields, a force in the focusing direction on the positive side (on the optical disc side) acts on the two focusing coils 20, so that the objective lens holder 10 is moved in the same direction on the same side.

Description will be made of the case of further performing the tracking control in a state where the objective lens holder 10 is moved in the positive focusing direction under the focusing control so that a portion of the tracking coil 30 lies off the magnet 6 (FIG. 3B).

For example, when the objective lens holder 10 is moved in the positive tracking direction, a current i is supplied to each of the tracking coils 30 in each direction indicated by each arrow. Directions of currents here are the same as in the above case of FIGS. 2A and 2B. For convenience of illustration, forces acting on the tracking coils 30 in the tracking direction are not shown in FIG. 3B.

As exemplarily illustrated in FIG. 3B, almost no force acts on the current flowing through a side lying off the magnet 6 among a pair of sides in the tracking direction of the tracking coil 30, however, forces corresponding to the polarities of the opposed surfaces of the magnet 6a and the magnet 6b making up the magnet 6 act on the currents flowing through sides opposed to the magnet 6. Specifically, in each tracking coil 30, a force F in the focusing direction acts on a portion opposed to the surface of the magnet 6a magnetized into the N-pole, while a force F' in the focusing direction on a side opposite to F acts on a portion opposed to the surface of the magnet 6b magnetized into the S-pole.

As described above, in each tracking coil 30, since the forces F and F' opposite in direction to each other are composed, the effective force in the focusing direction is reduced. On the other hand, in the objective lens driving apparatus 91 shown in FIGS. 6A and 6B, a force F2 in the positive focusing direction acts on a pair of the tracking coils 930 on the positive side in the tracking direction, while a force F2 in the negative focusing direction (away from the optical disc) acts on a pair of the tracking coils 930 on the negative side in the tracking direction, and thus, moment which induces rolling acts on the objective lens holder 910. As compared to this, in the objective lens driving apparatus 1 according to an embodiment of the present invention, the effective force in the focusing direction is reduced which may act on each tracking coil 30, and thus, the objective lens holder 10 is restrained from rolling. Thus, the coma aberration of the objective lens OBL is correspondingly restrained, and consequently, the recording/reproducing characteristics of the optical pickup apparatus are improved.

The phenomenon in which a portion of the tracking coil 30 lies off the magnet 6 (FIG. 6B) generally becomes more marked as the optical pickup apparatus becomes thinner in the focusing direction. However, the objective lens holder 10 may be restrained from rolling when the phenomenon occurs by using the objective lens driving apparatus 1 according to an embodiment of the present invention. Therefore, the objective lens driving apparatus 1 according to an embodiment of the present invention may satisfy both the thinning down and the maintenance or improvement in the recording/reproducing characteristics, of the optical pickup apparatus.

<<Focusing Control>>

The magnetic fields between the magnets 6 and the yokes 5 exemplarily illustrated in FIG. 4A are the same as the above described magnetic fields exemplarily illustrated in FIGS. 2A and 3A. In such magnetic fields, predetermined currents i are supplied to the two focusing coils 20, for example, a force in the focusing direction acts on the two focusing coils 20, so that the objective lens holder 10 is moved in the same direction. The exemplary illustration in FIG. 4B represents a state where the objective lens holder 10 is in an equilibrium position in the focusing direction immediately before being moved under the focusing control.

More detailed description will be made of distribution of the electric fields formed between the magnets 6 and the yoke 5 and distribution of Lorentz forces acting on the current flowing through the focusing coil 20 in the electric fields.

As described above, in an embodiment of the present invention, the pair of the magnets 6a with respect to each focusing coil 20 is set greater in magnetization width in the tracking direction than the pair of the magnets 6b with respect to the focusing coil 20. Therefore, as exemplarily illustrated in FIG. 4A, the magnetic fields between the magnets 6a and the yoke 5 are larger than the magnetic fields between the magnets 6b and the yoke 5. That is, in FIG. 4A, the density of the magnetic force lines B between the magnets 6a and the yoke 5 is greater than the density of the magnetic force lines B between the magnets 6b and the yoke 5.

If the focusing coil 20 is divided into eight sides C1 to C8 as exemplarily illustrated in FIG. 4A, the magnetic fields for the sides C1, C2, C3, C4, and C8 located on the magnetic 6a side in the tracking direction is greater than the magnetic fields for the sides C5, C6, and C7 located on the magnetic 6b side in the tracking direction. When the current i is supplied to the focusing coil 20, the effective electromagnetic forces act on the sides C1 to C8 corresponding to intensities and directions of the magnetic fields, and thus, the effective electromagnetic forces acting on the sides C1, C2, C3, C4, and C8 are greater on average than the electromagnetic forces acting on the sides C5, C6, and C7, and the effective electromagnetic forces acting on the sides C1, C2, C3, C4, and C8 have a direction opposite to that of the electromagnetic forces acting on the sides C5, C6, and C7. FIG. 5 shows an example of a result of calculations of the effective electromagnetic forces acting on the sides C1 to C8 of the focusing coil 20 by giving predetermined values to parameters such as shapes and coercive forces of the magnets 6a and the magnets 6b, shapes and materials of the focusing coil 20, a current supplied to the focusing coil 20, and permeability of the main body supporting the focusing coil 20.

As exemplarily illustrating in FIG. 5, the effective electromagnetic forces acting on the sides C4 and C8 sandwiched by the N-pole surfaces of the pair of the magnets 6a and parallel to the surfaces, are have the greatest absolute value on the positive side in the focusing direction. On the other hand, the effective electromagnetic forces acting on the side C6 sandwiched by the S-pole surfaces of the pair of the magnets 6b and perpendicular to the surfaces, have the smallest absolute value on the negative side in the focusing direction. The absolute values of the effective electromagnetic forces acting on the sides C1 to C3 sandwiched by the N-pole surfaces of the pair of the magnets 6a and not parallel to the surfaces are greater than the absolute values of the effective electromagnetic forces acting on the sides C5 to C7 sandwiched by the S-pole surfaces of the pair of the magnets 6b and not parallel to the surfaces.

Therefore, a force F (FIG. 4B), which is the sum of the respective effective electromagnetic forces for the positions of the sides C1, C2, C3, C4, and C8, acts on the focusing coil 20 in the positive focusing direction. On the other hand, is affected at a force F' (FIG. 4B), which is the sum of the respective effective electromagnetic forces for the positions of the sides C5, C6, and C7, acts on the focusing coil 20 in the negative focusing direction. The absolute value of the force F is greater than the absolute value of the force F' at a rate corresponding to the distribution of the effective electromagnetic forces exemplarily illustrated in FIG. 5. Therefore, the cancellation maybe restrained between the forces F and F' having directions opposite to each other, and thus, the focusing control may effectively be performed according to a degree of the difference between the magnetization widths. As exemplarily illustrated in FIG. 4B, forces symmetric with respect to the objective lens OBL respectively act on the two focusing coils 20, in an embodiment of the present invention.

As exemplarily illustrated in FIG. 4B, it is generally assumed that the objective lens holder 10 has a specific high-order bending vibration mode (dotted lines of FIG. 4B) having antinodes (Q1 and Q2 of FIG. 4B) at the both ends in the tracking direction and nodes (P1 and P2 of FIG. 4B) in the vicinities of the two focusing coils 20 closer the OBL, and that if this mode is excited at the time of the focusing control, high-order resonance of the objective lens holder 10 is generated.

In an embodiment according to the present invention, since the force F acts on the vicinities of the nodes P1 and P2 of the high-order bending vibration mode, the high-order resonance of the objective lens holder 10 is hardly excited. Even if the high-order resonance is excited in some degree by the force F, the force F', which has a direction opposite to the force F and whose absolute value smaller than the force F, acts on the vicinities of the antinodes Q1 and Q2 of the high-order bending vibration mode, and thus, the high-order resonance is restrained from being exited because of the following reason. A factor, which restrains the high-order resonance excited in some degree by the force F acting on the vicinities of the nodes P1 and P2 by causing the force F' to act on the antinodes Q1 and Q2, is assumed to be the product of the amplitude at the antinodes Q1 and Q2 and the absolute value of the force F' having the direction opposite to the force F. In an embodiment of the present invention, the high-order resonance is easily suppressed by the force F' which can be reduced in absolute value with increase of the amplitude at the antinodes Q1 and Q2.

Therefore, in the objective lens driving apparatus 1 according to an embodiment of the present invention, the high-order resonance of the objective lens holder 10 can easily be restrained, which may be excited at the time of the focusing control. That is, the high-order resonance of the objective lens OBL is restrained, and thus, the recording/reproducing characteristics of the optical pickup apparatus are improved.

=Improvement in Recording/Reproducing Characteristics=

The objective lens driving apparatus 1 according to an embodiment of the present invention at least includes: the base 2; the objective lens holder 10 that has the objective lens OBL, the two focusing coils 20 arranged in the tracking direction of the optical disc across the objective lens OBL, the two tracking coils 30 arranged in the tangential direction of the optical disc across the focusing coil 20 on the positive side in the tracking direction, and the two tracking coils 30 arranged in the tangential direction across the focusing coil 20 on the negative side in the tracking direction, and that is supported on the base 2 movably in the focusing direction and the tracking direction; and the four magnets 6 arranged on the base 2 so as to be respectively opposed to the four tracking coils 30 in the tangential direction, and the two magnets 6 on one side (the positive side or the negative side) in the tracking direction may be magnets each of which has two poles polarized in the tracking direction having different magnetization widths in the tracking direction of the two poles with respect to the focusing coil 20 on one side of the tracking direction.

In the objective lens driving apparatus 1, each of the pair of the tracking coils 30 arranged in the tangential direction across the focusing coil 20 may also be opposed to the two poles of the magnet 6 in the tracking direction as in the case with the focusing coil 20. Therefore, in the case of the tracking control, in each of the tracking coils 30, a force in the tracking direction acting on a current flowing through a portion opposed to the pole on one side in the tracking direction of the magnet 6 may be made in the same direction as a force in the tracking direction acting on a current flowing through a portion opposed to the pole on the other side in the tracking direction of the magnet 6. Therefore, currents flowing through the tracking coils are effectively utilized for the tracking control, so that the sensitivity of the tracking control, which leads to improvement in the recording/reproducing characteristics of the optical pickup apparatus.

In the objective lens driving apparatus 1, each of the pair of the tracking coils 30 arranged in the tangential direction across the focusing coil 20 may also be opposed to the two poles of the magnet 6 in the tracking direction, as in the case with the focusing coil 20. Therefore, in the case of further performing the tracking control in a state where the objective lens holder 10 is moved in the focusing direction on one side under the focusing control so that a portion of each tracking coil 30 lies off the magnet 6, a force in the focusing direction acting on the current flowing through the portion opposed to the pole on one side of the tracking direction of the magnet 6 may be made in a direction opposite to a force in the focusing direction acting on a current flowing through a portion opposed to the pole on the other side of the tracking direction of the magnet 6, in each of the tracking coils 30. Therefore, the force in the focus direction is reduced which may form the moment inducing the rolling of the objective lens holder 10, and thus, the objective lens holder 10 is restrained from rolling. As a result, the coma aberration of the objective lens OBL is restrained, and consequently, the recording/reproducing characteristics of the optical pickup apparatus are improved.

In the objective lens driving apparatus 1, since the magnetization widths of the two poles with respect to the focusing coil 20 in the tracking direction are different from each other, the magnetic field formed by one pole on one side in the tracking direction of the focusing coil 20 and the magnetic field formed by the other pole on the other side in the tracking direction of the focusing coil 20 are different in intensity from each other according to the difference of the magnetization widths. Therefore, cancellation may be restrained between the two forces in the focusing direction acting on the focusing coil 20 in the two magnetic fields, respectively, and thus, the focusing control may effectively be performed according to a degree of the difference between the magnetization widths. In the case of the tracking control described above, the sensitivity of the control may be improved in principle regardless of the degree of the difference between the magnetization widths. Therefore, in the objective lens driving apparatus 1, the sensitivity of the tracking control may be improved with the sensitivity of the focusing control being maintained at a predetermined level, by setting the degree of the difference between the magnetization widths at a predetermined value.

Therefore, the objective lens driving apparatus 1 may be provided whose recording/reproducing characteristics of the optical pickup apparatus are improved.

The above objective lens driving apparatus 1 further includes the yokes 5 disposed on the base 2 so as to be respectively surrounded by the focusing coils 20 each having the winding axis in the focusing direction. In the objective lens driving apparatus 1, a greater magnetic field is formed between the pair of the magnets 6 in the tangential direction across the focusing coil 20 and the yoke 5. That is, the greater magnetic field is formed at the locations of the focusing coil 20 and the pair of the tracking coils 30 in the tangential direction across the focusing coil 20, and thus, forces acting on the coils 20 and 30 in this magnetic field also become greater. Therefore, the sensitivity of the focusing control and the tracking control is improved.

In the above objective lens driving apparatus 1, a pole closer to the objective lens OBL has a magnetization width longer than a magnetization width of a pole farther from the objective lens OBL in the pair of the magnets 6 in the tangential direction. In the objective lens driving apparatus 1, according to the difference between the magnetization widths, a magnetic field from the pole closer to the objective lens OBL is greater than a magnetic field from the pole farther from the objective lens OBL. Therefore, in the focusing coil 20, a force in the focusing direction on one side acting on the focusing coil 20 on the OBL side in the tracking direction is greater than a force in the focusing direction on the other side acting on the focusing coil 20 on the side opposite to the OBL in the tracking direction. In general, the OBL side in the tracking direction corresponds to a node of a standing wave in high-order bending vibration mode of the objective lens holder 10, and the side opposite to the OBL in the tracking direction corresponds to an antinode of the standing wave. Therefore, in the objective lens driving apparatus 1, a force, whose absolute value is smaller than a force acting on the position of the node and whose direction is the focusing direction on the side opposite to the force acting on the position of the node, acts on the position of the antinode, and thus, the high-order resonance of the objective lens holder 10 is easily restrained which may be excited at the time of the focusing control. That is, the high-order resonance of the objective lens OBL is restrained, thereby improving the recording/reproducing characteristics of the optical pickup apparatus.

In the above objective lens driving apparatus 1, one of the pair of the magnets 6 in the tangential direction includes two magnets 6a and 6b having two poles respectively magnetized, and the other magnet includes two magnets 6a and 6b having two respective poles respectively magnetized. In the above objective lens driving apparatus 1, since the magnet 6a and the magnet 6b are separated from each other (divided magnets), design changes may easily be made such that one of the magnets has a coercive force, etc., different to the other, for example.

In the above objective lens driving apparatus 1, the pair of the magnets 6 in the tangential direction has such a width in the tracking direction that the pair of the tracking coils 30, each of which has the winding axis in the tangential direction and which are arranged in the same direction, lie off the magnets 6 when the objective lens holder 10 is moved in the tracking direction. Since the currents flowing through the tracking coils 30 are more effectively utilized for the tracking control in the objective lens driving apparatus 1, the sensitivity of the tracking control is more improved, which leads to improvement in the recording/reproducing characteristics of the optical pickup apparatus.

In the above objective lens driving apparatus 1, each of the four magnets 6 has two poles polarized in the tracking direction having different magnetization widths with respect to the focusing coil 20 in the tracking direction. The recording/reproducing characteristics of the optical pickup apparatus may be more effectively improved with this objective lens driving apparatus 1.

=Other Embodiments=

The above embodiments of the present invention are simply for facilitating the understanding of the present invention and are not in any way to be construed as limiting the present invention. The present invention may variously be changed or altered without departing from its spirit and encompass equivalents thereof.

Although the opposing surfaces of the pair of the magnets 6a in the tangential direction are magnetized into the N-poles and the opposing surfaces of a pair of the magnets 6b in the tangential direction are magnetized into the S-poles in an embodiment according to the present invention described above, this is not a limitative, and the former may be magnetized into the S-pole and the latter may be magnetized into the N-pole.

Although a supporting means for the objective lens holder 10 on the base 2 includes the elastic wires 7 and the fixing plate 3 in an embodiment of the present invention, this is not a limitative, and any means may basically be used as long as the means supports the objective lens holder 10 on the base 2 movably in the focusing direction and the tracking direction.

Although the magnet 6 has a magnetization width on the OBL side in the tracking direction greater than a magnetization width on the side opposite to the OBL in the tracking direction in an embodiment according to the present invention described above, this is not a limitative, and the magnetization width on the side opposite to the OBL in the tracking direction may be wider than the magnetization width on the OBL side of the tracking direction, for example.

Although the magnet 6 is made up of the separate magnets 6a and 6b in an embodiment according to the present invention described above, this is not a limitative, and the magnet 6 may be an integrated bipolar magnet having two areas which are adjacent to each other in the tracking direction with a magnetization boundary line therebetween and have different poles respectively magnetized, for example.

Although the magnet 6 has such a width in the tracking direction that the opposed tracking coil 30 does not lie off the magnet 6 when the objective lens holder 10 is moved in the tracking direction in an embodiment according to the present invention described above, this is not a limitative, and the magnet 6 may have such a width in the tracking direction that the tracking coil 30 is allowed to lie off the magnet 6 within an extent that the sensitivity of the tracking control may be maintained at a predetermined magnitude.

Each of the four magnets 6 has two poles polarized in the tracking direction having different magnetization widths with respect to the focusing coil 20 in the tracking direction in an embodiment according to the present invention described above. However, this is not limitative, and such magnet 6 may be used for only the two magnets 6 on one side (the positive side or the negative side) in the tracking direction. For example, only the two magnets 6 on the positive side in the tracking direction may be magnets each of which has two poles polarized in the tracking direction having different magnetization widths in the tracking direction with respect to the focusing coil 20 on the positive side in the tracking direction, or only the two magnets 6 on the negative side in the tracking direction may be magnets each of which has two poles polarized in the tracking direction having different magnetization widths in the tracking direction with respect to the focusing coil 20 on the negative side in the tracking direction.

What is claimed is:

1. An objective lens driving apparatus comprising:
   a base opposed to a signal surface of an optical disc;
   an objective lens holder including an objective lens, first and second focusing coils arranged in line with the objective lens in a tracking direction of the optical disc, first and second tracking coils arranged in line with the first focusing coil in a tangential direction of the optical disc, and third and fourth tracking coils arranged in line with the second focusing coil in the tangential direction, the objective lens holder being supported on the base movably in a focusing direction of the optical disc and in the tracking direction; and
   first to fourth magnets arranged on the base so as to be respectively opposed in the tangential direction to the first to fourth tracking coils, each magnet comprising:
   a first pole portion that is magnetized to a first pole; and
   a second pole portion that is magnetized to a second pole opposite in polarity to the first pole,
   wherein, for each of the first to fourth magnets:
   the first pole portion is located closer to the objective lens than the second pole portion,
   the first pole portion and the second pole portion are each polarized in the tracking direction, and
   the magnetization width of the first pole portion is greater than the magnetization width of the magnet magnetized to the second pole portion, the magnetization widths being with respect to the tracking direction.

2. The objective lens driving apparatus of claim 1, further comprising
   a first yoke arranged on the base so as to be surrounded by the first focusing coil having a winding axis in the focusing direction; and
   second yoke arranged on the base so as to be surrounded by the second focusing coil having a winding axis in the focusing direction.

3. The objective lens driving apparatus of claim 1,
   wherein the first tracking coil:
      has a winding axis in the tangential direction,
      is located between the first magnet and the first focusing coil, in the focusing direction, and
      when the objective lens holder is moved in the tracking direction, the movement of the first tracking coil is within a distance defined, in the tracking direction, by the combined magnetization widths of the first pole portion and the second pole portion of the first magnet; and
   wherein the second tracking coil:
      has a winding axis in the tangential direction,
      is located between the second magnet and the first focusing coil, in the focusing direction, and
      when the objective lens holder is moved in the tracking direction, the movement of the second tracking coil is within a distance defined, in the tracking direction, by the combined magnetization widths of the first pole portion and the second pole portion of the second magnet;
   wherein the third tracking coil:
      has a winding axis in the tangential direction,
      is located between the third magnet and the second focusing coil, in the focusing direction, and
      when the objective lens holder is moved in the tracking direction, the movement of the third tracking coil is within a distance defined, in the tracking direction, by the combined widths of the first pole portion and the second pole portion of the third magnet; and
   wherein the fourth tracking coil:
      has a winding axis in the tangential direction,
      is located between the fourth magnet and the second focusing coil, in the focusing direction, and
      when the objective lens holder is moved in the tracking direction, the movement of the fourth tracking coil is within a distance defined, in the tracking direction, by the combined magnetization widths of the first pole portion and the second pole portion of the fourth magnet.

* * * * *

UNITED STATES PATENT AND TRADEMARK OFFICE
CERTIFICATE OF CORRECTION

PATENT NO. : 8,315,141 B2
APPLICATION NO. : 12/407147
DATED : November 20, 2012
INVENTOR(S) : Noboru Onojima and Shingo Matsuzaki Page 1 of 1

It is certified that error appears in the above-identified patent and that said Letters Patent is hereby corrected as shown below:

Claim 1, Column 13, Lines 45-46, after "of" delete "the magnet magnetized to".

Signed and Sealed this
Twelfth Day of February, 2013

Teresa Stanek Rea
*Acting Director of the United States Patent and Trademark Office*